United States Patent [19]

Jeffrey

[11] Patent Number: 4,879,171
[45] Date of Patent: Nov. 7, 1989

[54] THERMAL CAMOUFLAGE FABRIC
[75] Inventor: Robert F. Jeffrey, Bolton, England
[73] Assignee: J & D Wilkie Limited, United Kingdom
[21] Appl. No.: 311,722
[22] Filed: Feb. 16, 1989
[30] Foreign Application Priority Data
  Feb. 19, 1988 [GB]  United Kingdom ................ 8803965
  Mar. 28, 1988 [GB]  United Kingdom ................ 8807325
[51] Int. Cl.⁴ ........................ B32B 7/00; D03D 15/00
[52] U.S. Cl. .................................... 428/259; 428/347;
                428/461; 428/516; 428/919; 428/626
[58] Field of Search ............... 428/259, 347, 461, 516,
                                                       428/919, 626
[56] References Cited
U.S. PATENT DOCUMENTS
  4,493,863  1/1985  Karlsson ............................. 428/919
  4,529,633  7/1985  Karlsson ............................. 428/919
  4,615,921 10/1986  Johansson ........................... 428/919

Primary Examiner—Marion C. McCamish
Assistant Examiner—Nizar M. Ibrahim
Attorney, Agent, or Firm—Joseph S. Iandiorio; Brian M. Dingman

[57] ABSTRACT

A thermal camouflage fabric (12) comprising a heat reflective composite material (14, 16) which is coated on both of its sides with a protective material (18), the heat reflective composite material (14, 16) comprising at least one layer of a metal (14) and at least one layer of a flexible support material (16), the protective material (18) being such that it protects the heat reflective composite material (14, 16) from damage and such that it has predetermined thermal emission characteristics, the protective material (18) being securely bonded to the heat reflective composite material (14, 16), and the thermal camouflage fabric (12) being such that the heat reflective composite material (14, 16) is first formed from the said at least one layer of the metal (14) and the said at least one layer of the flexible support material (16), and is then woven.

7 Claims, 2 Drawing Sheets

THERMAL CAMOUFLAGE FABRIC

This invention relates to a thermal camouflage fabric and to a method of producing the thermal camouflage fabric.

Thermal camouflage fabric is well known. The known thermal camouflage fabric is mainly used by land forces to cover items of essential equipment that produce heat and that may thus be detected by an enemy using infra red or other heat detection equipment. Thus, for example, an army may use the thermal camouflage fabric to cover tanks and gun emplacements. If desired, the thermal camouflage fabric can also be used by other armed forces so that, for example, aircraft on an airfield may be camouflaged using the thermal camouflage fabric.

The thermal camouflage fabric at present in use is a composite fabric which is produced by a multi-stage process comprising the initial weaving of polyolefin flat tape to form a woven fabric, the surface preparation of the woven fabric by primer material, then the aluminium coating of the primed woven fabric by vacuum deposition, and finally the extrusion coating of the aluminised woven fabric with a protective material in the form of polyolefin film. The thermal camouflage fabric is produced in two basic types, one type for being use in a temperate zone and designated "Thermal Camouflage Woodland" and the other type being for use in Northern European zones and designated "Thermal Camouflage Arctic". These two fabrics differ only in their reflectance (ie emissive) properties.

The known thermal camouflage fabric at present in use is difficult to manufacture such that it is of a consistent and acceptable quality. An unacceptable level of reject fabric is produced due to difficulties in obtaining adequate levels of bonding between the various layers in the thermal camouflage fabric. The high reject rate appears to be due to delamination problems, together with problems of providing the coating layers of the primer material and the protective material. In addition to delamination during manufacture, the known thermal camouflage fabric is subject to further delamination during use as a result of flexing and abrasion on the thermal camouflage fabric.

It is an aim of the present invention to provide thermal camouflage fabric which can be produced in a manner and a quality which obviates or reduces the above mentioned problems associated with the known thermal camouflage fabric.

Accordingly, this invention provides a thermal camouflage fabric comprising a heat reflective composite material which is coated on both of its sides with a protective material, the heat reflective composite material comprising at least one layer of a metal and at least one layer of a flexible support material, the protective material being such that it protects the heat reflective composite material from damage and such that it has predetermined thermal emission characteristics, the protective material being securely bonded to the heat reflective composite material, and the thermal camouflage fabric being such that the heat reflective composite material is first formed from the said at least one layer of the metal and the said at least one layer of the flexible support material, and is then woven.

The predetermined thermal emission characteristics will usually be those required of the known thermal camouflage fabric. For example, the required predetermined thermal emission characteristics may be those obtained in the range of 750-900 nm. The determination of the reflectance may be made by means of a spectrophotometer fitted with a reflection attachment and working over the required wavelength range. The reference standard will usually be barium sulphate having a minimum thickness of 2 mm. The reflectance may also be determined in the wavelength range of 8-13 micrometers.

Preferably, the metal is aluminium but other metals including metalised plastics materials may be employed if desired. Generally, the metal may be formed as a coating or as a separate foil. The metal employed should be such that it is able to mask the heat that would normally come from the equipment to be covered by the thermal camouflage fabric.

Preferably, the heat reflective composite material includes woven tape which extends in the warp direction. Thus, preferably, the flexible support material in the form of tape having been provided with a coating layer of the metal is then woven such that the tape extends in the warp direction. Preferably, the said at least one layer of the metal is sandwiched between layers of the flexible support material but, if desired, the said at least one layer of flexible support material may be sandwiched between layers of the metal.

When the heat reflective composite material is formed of woven tape which extends in the warp direction. the heat reflective composite material may also include tape which extend in the weft direction. This tape extending in the weft direction is preferably just formed of the flexible support material but, if desired, the tape extending in the weft direction may have on metalised surface. It is preferred that the tape extending in the weft direction is formed only of the flexible support material because the flexible support material is then exposed and is able to receive the protective material. The protective material adheres better to the flexible support material than to the metal.

The heat reflective composite material may also be such that the flexible support material is in the form of textile yarn, and in this case the said at least one layer of the metal may be provided on the yarn, for example by vacuum coating. The yarn may be a spun yarn of natural fibres and synthetic staple fibres. The yarn may alternatively be extruded synthetic monofilament or extruded synthetic multifilament material. The yarns may be coated and then woven as warp threads and/or weft threads. The resulting fabric may or may not be coated after weaving. The resulting fabric may be pigment printed direct to the fabric surface.

The flexible support material will usually be a plastics material. The plastics material will usually be a polyolefin. A presently preferred polyolefin is polyethylene. The polyethylene is preferably an orientated high density polyethylene.

The protective material will usually be a plastics material. The plastics material is preferably a polyolefin. A presently preferred polyolefin is polyethylene. The polyethylene is preferably a low density non-orientated polyethylene.

Where plastics materials are used for the flexible support material and for the protective material, they should be chosen such that they are able securely to be bonded together. For example, if the support material is a polypropylene support material, then the protective material should also be polypropylene since layers of polypropylene and polyethylene may not form a sufficiently secure bond.

Preferably, the protective material is extruded directly on to the heat reflective composite material since this forms a good secure bond between the protective material and the heat reflective composite material. However, if desired, the protective material may be separately extruded, in which case it may be laminated to the heat reflective composite material, for example using appropriate heat activated adhesives.

The protective material may be the protective material used in the known thermal camouflage fabric. The protective material may contain appropriate chemicals and pigments to give the thermal camouflage fabric the required thermal emission characteristics and the required colour. For example, thermal camouflage fabric which is designated as "Thermal Camouflage Woodland" is olive green is colour whilst thermal camouflage fabric designated as "Thermal Camouflage Arctic" is greyish white in colour.

The metal in the heat reflective composite material may be provided as a separately formed sheet or film of metal, or as a layer of metal formed by a vacuum deposition on the appropriate surface or surfaces of the flexible support material.

The present invention also provides a method of producing the thermal camouflage fabric, which method comprises forming a composite of metal and the flexible support material, weaving the composite to produce a heat reflective composite material, and securely bonding a protective material to the heat reflective composite material.

In a first method of the invention, the method comprises providing a first roll of the support material having metal on one side, providing a second roll of the support material having metal on one side, bringing the two rolls together such that the metal is sandwiched between the support material, cutting the rolls into a plurality of tapes, weaving the tapes to form the heat reflective composite material whilst maintaining the metal in its position between the support material, and subsequently securely bonding the protective material to the heat reflective composite material. Preferably the tapes extend in the warp direction.

The metal may be maintained in its position between the support material by polarising the rolls of the support material. By appropriately oppositely polarising the layers of metal, the two layers of metal may be attracted to each other. Alternatively, the metal may be maintained in its position between the support material by the use of appropriate adhesives.

In a second method of the invention, the method comprises providing a first roll of the support material, providing a second roll of the support material, providing a third roll of metal, bringing the first, second and third rolls together to sandwich the metal between the support material, cutting the rolls into a plurality of tapes, weaving the tapes to form the heat reflective composite material whilst maintaining the metal in its position between the support material, and subsequently securely bonding the protective material to the heat reflective composite material. Preferably the tapes extend in the warp direction.

A third method of producing the thermal camouflage fabric is the same as the first method but with the rolls of the metal and the support material being reversed.

A fourth method of producing the thermal camouflage fabric is to use a previously prepared roll of composite material comprising a layer of the flexible support material sandwich between the two layers of metal. The roll of composite material can then be cut into a plurality of tapes and woven to form the heat reflective composite material.

A fifth method of producing the thermal camouflage fabric is to use a previously prepared roll of composite material comprising a layer of the support material bonded to a single layer of metal. The roll of composite material can then be cut into a plurality of tapes and woven to form the heat reflective composite material.

The production of the thermal camouflage fabric by the above described methods of the invention has advantages in that the cutting of the rolls to tapes and the subsequent weaving can all be effect on a single loom. In addition, by limiting the metalised surface to either the warp threads, or to the warp threads and one face of the weft threads, an unmetalised surface is always present to receive the protective material. Furthermore, a plurality of rolls can be mounted side by side so that weaving can be conducted up to the width of the loom or other weaving machine employed. This is in itself a considerable advantage over the known thermal camouflage fabric which is produced within the width limits of the vacuum coated process, usually aproximately 1.5 meters, and which then needs to be sewn together to make up the desired required widths for the thermal camouflage fabric. This is because the aluminium that was used in the known thermal camouflage fabric was only obtainable from the manufacture in the widths of under 1.5 meters. By mounting the rolls side by side, the required with of each reflective composite material and therefore the required width of the thermal camouflage fabric can easily be formed, which reduces the sewing step that was previously employed in the known thermal camouflage fabric. In addition to reducing possible inconsistent and/or weak areas due to the sewing, a reduction in manufacturing costs can also be achieved. The produced widths of the heat reflective composite material may only be limited by the available widths of the protective material.

If desired, the tapes may been separately produced remote from a loom, and subsequently woven to form the heat reflective composite material. Preferably, however, the tapes are formed on the loom.

Where the tapes are separately formed from the loom, they will usually be produced by extruding flexible support material in the form of oriented film, providing the required composite by lamination or alternative processes, and cutting the composite by passing it over knives to form tapes of the required widths. The orientation of the film usually involves stretching the film almost to its breaking point, then relaxing the stretching force, whereupon the molecules in the film line up and produce the required tensile strength. Where the film is to be cut and woven on a loom, it is then necessary to provide the film with the required tensile strength and, in this case the film is thus stretched before it is cut on the loom to bring it into its orientated form.

The thermal camouflage fabric of the present invention may be produced in any desired shapes and sizes. The fabric may be provided with fastener means such for example as eyelets depending upon the intended use of the thermal camouflage fabric. Generally, the thermal camouflage fabric of the present invention can be used for any of the currently used purposes of the known thermal camouflage fabric. Thus, for example, the thermal camouflage fabric can be used to cover tanks and gun emplacements. If desired, the thermal camouflage fabric can also be used to cover persons aso that it may be formed as covers or clothing.

The tapes may be, for example, from 0.5 mm–30 mm wide and, more preferably, from 1.17 mm–3 mm wide.

Embodiments of the invention will now be described solely by way of example and with reference to the accompanying drawings in which.

Figure 1:
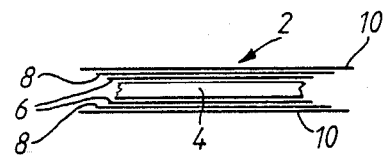
FIG. 1 is a diagrammatic section through known thermal camouflage fabric.

Referring to FIG. 1, there is shown a known thermal camouflage fabric 2 comprising a base fabric formed from woven flat tape. The tape is produced from a polyolefin film 4 which is provided with a layer 6 of primer on both of its sides. Aluminium layers 8 are provided on top of the primer layers 6. The film 4 and the layers 6, 8 form a composite base fabric which is then provided with a surface coating in the form of layers 10 of a protective material which is low density polyethylene.

The thermal camouflage fabric 2 is produced by a multi-stage process comprising the initial weaving of polyolefin flat tape to form a woven fabric, the surface preparation of the woven fabric by primer material, then the aluminium coating of the primed woven fabric by vacuum deposition, and finally the extrusion coating of the aluminised woven fabric with a protective material in the form of polyolefin film. This process of manufacturing the thermal cambouflage fabric 2 gives only marginal levels of adhesion between the layers 4, 8 and 10. This in turn gives rise to serious problems of quality and reproducibility. Also, during use of the thermal camouflage fabric 2, further delamination can occur when abrasion breaks through the outer protective layers 10 and the aluminium layers 8.

Figure 2:
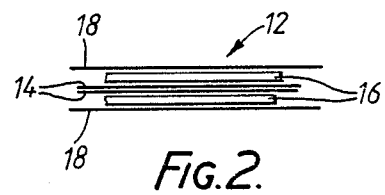
FIG. 2 is a diagrammatic cross section through first thermal camouflage fabric of the present invention.

Referring now to FIG. 2, there is shown first thermal camouflage fabric 12 in accordance with the present invention. The thermal camouflage fabric 12 has two aluminium layers 14 sandwiched between two layers 16 formed of high density polyethylene. The layers 16 form a flexible support material for the aluminium layers 14. The layers 14, 16 together form a heat reflective composite material which may be regarded as equivalent to the base fabric formed by the layers 4, 6, 8 in FIG. 1. The heat reflective composite material is then coated with protective material in the form of layers 18 of low density polyethylene.

The thermal camouflage fabric 12 is such that the protective layers 18 protect the heat reflective composite material from damage. The protective layers 18 give the thermal camouflage fabric 12 predetermined required thermal emission characteristics. This is achieved by providing the layers 18 with appropriate thermally emissive chemicals. Pigments are also included in the layers 18 to give the thermal camouflage fabric 12 a required colour, for example olive green or grey white. The layers 18 are securely bonded to the flexible support material formed by the layers 16. The secure bonding can be effected in a variety of ways and, in particular, the plastics materials chosen for the layers 16, 18 are chosen such that secure bonding is facilitated, and not hindered by the aluminium which does not permit good adhesion. For example, the plastics materials may be the same so that the layers 16 may be high density orientated polyethylene layers 16 whilst the layers 18 may be low density non-orientated polyethylene layers 18.

Figure 3:
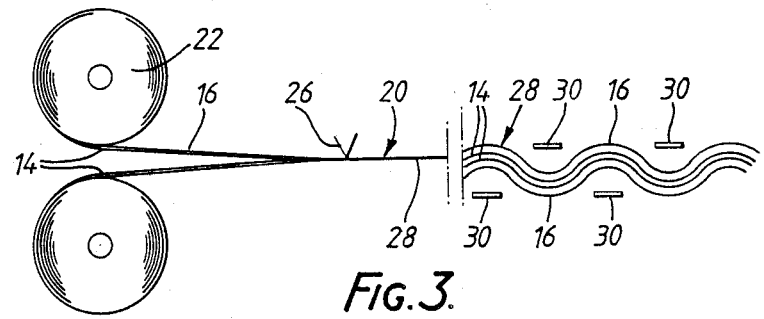
FIG. 3 illustrates a first method in accordance with the present invention of making thermal camouflage fabric, which thermal camouflage fabric is as shown in FIG. 2.

FIG. 3 illustrates a method of producing the thermal camouflage fabric 12 shown in FIG. 2. More specifically, FIG. 3 shows the production of heat reflective composite material 20. This heat reflective composite material 20 is formed by bringing together material on two rolls 22, 24. The material on each roll 22, 24 is composed of the high density polyethylene layers 16 with the aluminium layers 14 so disposed that the aluminium layers 14 are on the inside as shown. As the material on the two rolls 22, 24 is brought together, the aluminium layers 14 become sandwiched between the layers 16. A series of knives 26 are employed to cut the heat reflective composite material into tapes which are then woven to form fabric materials. A plurality of the tapes 28 form warp threads in the woven fabric material. The tapes 28 can also form weft threads 30 if desired. The produced fabric material is then coated on both of its sides with the protective material in the form of the layers 18 to form the completed thermal camouflage fabric 12 as shown in FIG. 2.

Figure 4:
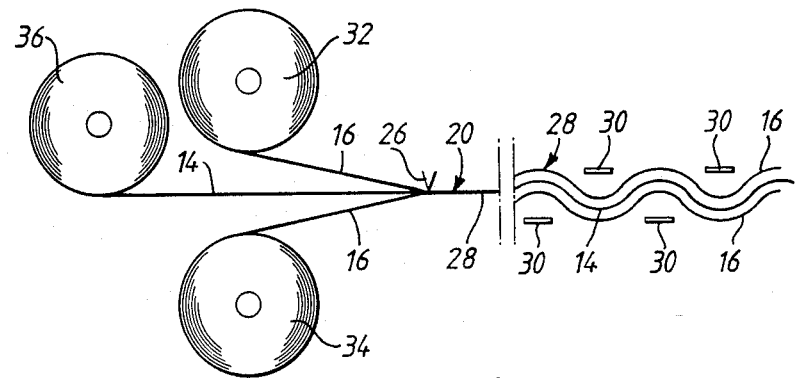
FIG. 4 shows a second method in accordance with the invention of making thermal camouflage fabric, which thermal camouflage fabric is in the form of second thermal camouflage fabric of the present invention.

Referring to FIG. 4, it will be seen that three rolls 32, 34, 36 are employed. The rolls 32, 34 contain material which is to form the layers 16. The roll 36 contains aluminium material which is to form a single aluminium layer 14. It will thus be seen that the produced heat reflective composite material 20 and the subsequently produced tapes 28 only have a single aluminium layer 14. The method illustrated in FIG. 4 also avoids providing the layers 16 with the aluminium layers 14 as in the method illustrated in FIG. 3. Thus the method of FIG. 4 can be used to provide second thermal camouflage fabric.

Figure 5:
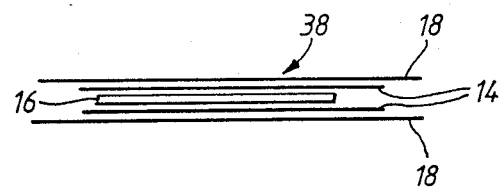
FIG. 5 shows third thermal camouflage fabric in accordance with the invention.

Referring now to FIG. 5, there is shown thermal camouflage fabric 38 which is like the thermal camouflage fabric produced according to the method shown in FIG. 3 except that the aluminium layers 14 are on the outside of a single layer 16 of high density polyethylene. Thus the heat reflective composite material is formed by the two layers 14 of aluminium positioned on either side of the single layer 16 which forms the flexible support material.

Figure 6:
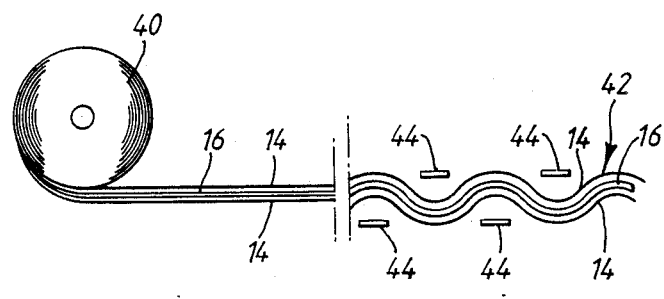
FIG. 6 shows a third method in accordance with the present invention of making the thermal camouflage fabric shown in FIG. 5.

FIG. 6 shows how the thermal camouflage fabric 38 shown in FIG. 5 can be produced. More specifically, FIG. 6 illustrates the initial formation of the heat reflective composite material prior to the provision of the protective layers. It will be seen from FIG. 6 that the heat reflective composite material is provided as laminate material on a roll 40. As the roll 40 is unwound, it is cut into a plurality of tapes which are then woven on a loom (not shown) into woven flexible support material having warp tapes 42. Weft tapes 44 are also provided. These weft tapes 44 are preferably just formed of the flexible support material constituting the layer 16. In this case the weft tapes 44 do not have any aluminium on them and they are better able to bond to the protective layers 18. If desired however the weft tapes 44 may be the same as the warp tapes 42, that is composed of the layers 14 and 16.

The thermal camouflage fabric film produced according to the present invention is such that it is easier to produce than the above mentioned known thermal camouflage fabric and, as such, manufacturing difficulties with the consequent serious problems of quality and reproducibility will be reduced. Furthermore, failure of the thermal camouflage fabric due to abrasion may be substantially improved.

It is to be appreciated that the embodiments of the invention described above with reference to the accompanying drawings have been given by way of example only and that modifications may be effected. Thus, for example, metals other than aluminium may be used providing they have the required reflective characteristics.

I claim:

1. A thermal camouflage fabric comprising a heat reflective composite material which is coated on both of its sides with a protective material, the heat reflective composite material comprising at least one layer of a metal and at least one layer of a flexible support material, the protective material being such that it protects the heat reflective composite material from damage and such that it has predetermined thermal emission characteristics, the protective material being securely bonded to the heat reflective composite material, and the thermal camouflage fabric being such that the heat reflective composite material is first formed from the said at least one layer of the metal and the said at least one layer of the flexible support material, and is then woven.

2. A thermal camouflage fabric according to claim 1 in which the heat reflective composite material includes woven tape which extends in the warp direction.

3. A thermal camouflage fabric according to claim 1 or claim 2 in which the said at least one layer of the metal is sandwiched between layers of the flexible support material.

4. A thermal camouflage fabric according to claim 1 or claim 2 in which the heat reflective composite material is such that the flexible support material is in the form of a textile yarn, and in which the said at least one layer of the metal is provided on the yarn.

5. A thermal camouflage fabric according to claim 1 in which the metal is aluminium, in which the flexible support material is a plastics material, and in which the protective material is a plastics material.

6. A thermal camouflage fabric according to claim 5 in which the plastics material forming the flexible support material is an oriented high density polyethylene, and in which the plastics material forming the protective material is a low density non-orientated polyethylene.

7. A thermal camouflage fabric according to claim 1 or claim 2 in which the protective material is extruded directly on to the heat reflective composite material.

* * * * *